3,743,673
SINGLE STEP SULFOXIDATION PROCESS
John Douglas Downer, Ronald Maurice Skinner, David Robert Reed, and Donald Patrick Hope-Ross, Pointe-a-Pierre, Trinidad, West Indies, assignors to Texaco Trinidad, Inc., Trinidad, West Indies
No Drawing. Filed May 26, 1970, Ser. No. 40,740
Int. Cl. C07c 139/00
U.S. Cl. 260—504 R          11 Claims

ABSTRACT OF THE DISCLOSURE

Saturated aliphatic hydrocarbons are converted to aliphatic sulfonic acids in a single step without any initiator but in the presence of a low molecular weight acyl oxide and under anhydrous conditions with continuous removal of the products as they are being formed. The reactants are agitated throughout the reaction which is carried out at 25–55° C. at a pressure ranging from 0 to 100 p.s.i. The alkali metal salts of the sulfonic acids prepared by this process are useful as biodegradable detergents.

BACKGROUND OF THE INVENTION

This invention relates to a sulfoxidation process and more particularly to a process for converting paraffins to biodegradable alkali metal salts of sulfonic acids.

As is well known, sulfoxidation is the free radical reaction of a paraffin with sulfur dioxide and oxygen. Two basic sulfoxidation processes are known—the light/water and the acetic anhydride-promoted methods. All other reported techniques are variations on these basic methods.

In the sulfoxidation process initiated by light/water, the reaction proceeds as follows:

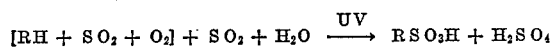

$$[RH + SO_2 + O_2] + SO_2 + H_2O \xrightarrow{UV} RSO_3H + H_2SO_4$$

The reaction is carried out in the presence of water and it is essential to irradiate or add free radical donors in order to perpetuate the reaction. The main differences between the various reported modifications of this process lie in the techniques used for initiating the reaction. This process and its modifications are disadvantageous from the standpoints of requiring expensive special radiation-transmitting equipment and costly radiation generating facilities.

The acetic anhydride-promoted process is a two-step process. Stage one involves the formation of a mixed peranhydride of sulfonic and acetic acids. In stage two, the peranhydride initiates the further reaction of paraffin molecules with $SO_2$ and oxygen. It has been found that the presence of water during the second stage is necessary to avoid objectionable darkening of the product and to minimize further reaction to di- and polysulfonic acids. Because the above-described process is a two-stage process it does not lend itself to continuous operation.

SUMMARY OF THE INVENTION

The present invention provides a one step sulfoxidation process for making sulfonic acids from which valuable biodegradable detergents can easily be made.

Briefly stated, the process of the invention comprises reacting in a reaction zone substantially straight chained saturated hydrocarbons of about 7 to about 24 carbon atoms per molecule with oxygen and sulfur dioxide under substantially anhydrous conditions in the presence of acetic anhydride or other low molecular weight acyl oxide at temperatures of about 25 to 55° C. under pressures of from about 0 to about 100 p.s.i.g. while agitating throughout the process the reactants and continuously removing the heavy phase containing product and entrained unreacted paraffins from the reaction zone. straight-chain saturated hydrocarbons up to 35 carbon atoms per molecule, and higher, can be sulfoxidated provided the feedstock is presented as a liquid over the desired reaction temperature range. n-Paraffins which are normally solid over the range 25–55° C. may be sulfoxidated in solution in an inert solvent; e.g. halogenated hydrocarbons, or in admixture with liquid n-paraffins.

With the process of this invention, a light-colored product is obtained and the formation of bifunctional product and of by-product sulfuric acid is minimized. Further, the reaction is self-initiating and requires no initiation step.

DETAILED DESCRIPTION OF THE INVENTION

The paraffin reactants used in the present process can be of a single species, e.g. n-undecane, but generally will be fed to the reaction zone in the form of a mixture comprising molecules containing from 7 to 24 carbon atoms. It has been noted that the presence of even as little as 0.01% of aromatics or of olefins inhibit the reaction and produce a very dark colored reaction medium. Accordingly, the paraffin feed should be oleum-treated to remove all but 0.01% weight of these materials. The feed can contain up to 2.0% by weight of branched-chain material but normally will consist essentially of straight chained material.

The reaction rate is limited by the length of the chain reaction, and is dependent on a number of interrelated factors, the most important being concentration of free radicals, the temperature and pressure of the reaction, and mass transfer. The number of free radicals required for sustained reaction varies according to the reaction conditions, the concentration of reactants and the molecular weight of the feedstock. Perhaps the most important factor is that the concentration of free radicals is directly proportional to the rate of decay of an alkylacetylsulphony peroxide. The decay rate equation was shown to be a first order reaction of the form:

$$\log_{10} C = 0.4343Kt + \log_{10} C_0$$

where $C_0$ is the initial concentration, C the concentration at time $t$, and K the rate constant.

The rate constant K decreases with increase in the chain length of the alkyl group. Thus as the feedstock gets heavier more peroxide intermediate is required for sustained reaction; this is achieved by increasing the acetic anhydride concentration. The optimum acetic anhydride concentration ranges from 1 to 3% weight for a feedstock which ranges in carbon content from $C_{11}$ to $C_{18}$. Increasing the concentration above 3% has no significant effect on conversion or on product distribution over the pressure range of 0–75 p.s.i.g.

An increase in reaction pressure over the range 0–75 p.s.i.g. brings about an increase in reaction rate, that is where mass transfer is rate determining. This increase in reaction rate as the pressure increases becomes more pronounced the higher the molecular weight of the paraffin charge and is accompanied by an increase in conversion to di- and poly-sulfonic acids.

Experimental data have shown that optimum reaction temperature is 35° C. While the decomposition of the peroxide intermediate is dependent on temperature, the reaction rate is not dependent on the decay rate of the peroxide as long as the peroxy content is above a certain value which varies with the molecular weight of the paraffin. The maximum peroxide content attainable decreases with an increase in temperature above 35° C. It has been shown that there is no significant change in reaction rate when increasing the temperature from 35 to 55° C.; however, the percent weight polysulfonates in the product increases and the color increases.

The mass transfer will depend upon the mixing conditions and gas dispersion. Within broad limits, neither the recycle rate nor the impeller speed has an appreciable effect on reaction rate or product composition. At any given pressure (0–75 p.s.i.g.) the reaction rate increases linearly with increase in the $SO_2/O_2$ ratio of the reactor gas, up to a maximum beyond which the rate decreases. However, the monosulfonic acids content of the total sulfonic acids produced decreases linearly with increase in $SO_2/O_2$ reactor gas ratio. Thus an increase in both reaction pressure and $SO_2/O_2$ reactor gas ratio leads to the formation of more polysulfonic acids. Quality-wise, however, these polyacids can be tolerated in a commercial detergent. Reaction rate increases with gas rate but the sulfonic acids: sulfuric acid ratio decreases. Gas rate does not influence the rate of decay of the peroxide intermediate.

This process results in two principal by-products, sulfuric acid and polysulfonic acids. Both are wasteful in $SO_2$ but neither has an appreciable effect on the process or on the product quality.

The first of these is formed by reactions inherent in the sulfoxidation reaction mechanism, e.g.

(a) 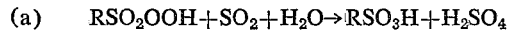

This is more prevalent in the light/water process where water is added. It is possible in the present anhydrous process because water can be formed.

(b) 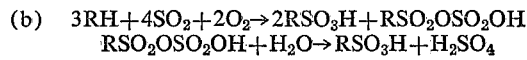

Sulfuric acid also results from the reaction of $SO_2$, oxygen, and water, both during the reaction and the working-up of the heavy product phase. Thus increasing the gas rate or reaction pressure has an adverse effect on sulfuric acid production. The formation of sulfuric acid can be reduced from 33 to 25 mole percent by removing free $SO_2$ quickly from the heavy product phase, e.g. by degassing or neutralization. Sulfuric acid may be extracted from the product and recovered.

As regards the production of polysulfonic acids, increasing the reaction pressure and/or $SO_2/O_2$ ratio increases the amount of polysulfonic acids formed. Polysulfonic acids formation is reduced by limiting the length of the chain reaction but this requires high acetic anhydride usage and a high recycle rate.

GENERAL WORKING PROCEDURE

Fresh normal paraffins and acetic anhydride and recycle normal paraffins are charged continuously to the top of a stirred tank reactor. A mixture of sulfur dioxide and oxygen enter through the bottom of the reactor. The reactor is equipped with baffles and a high speed agitator to ensure good liquid/gas mixing. The reactor contents are maintained at 35° C. by continuous circulation through an outside loop fitted with a heat exchanger. This effectively removes reaction heat and also assists the mixing of reactor ingredients. A vent stream leaving the top of the reactor is routed to a vapor liquid separator for removal and return to the reactor of entrained liquid. The gases remaining are passed to a gas holder for eventual recycle back to the reactor.

The product sidestream is continuously withdrawn from the reactor loop and passed to a settler for the separation of crude acid and unreacted paraffin phases. The paraffins are taken from the top of the settler to a surge tank for intermediate storage prior to recycling back to the reactor. Any free gases carried into the settler are released through a vent line leading to the gas holder. The heavy crude acid phase is routed to a mixing pump for part neutralization with 30% NaOH. The neutralized product from this stage is closely controlled to a pH of 2–3 to favor the breakdown of any sulphites formed by addition of water to dissolved sulfur dioxide. In a preferred embodiment, the heavy phase is brought to alkaline conditions (pH 8–9) to decompose per compound and trap sulfur dioxide in the form of bisulphite. In a second stage, this phase is made slightly acid to break down the bisulphite and in a third stage the product is neutralized to pH 7.0. Reaction heat is removed by heat exchange. The product is then degassed for removal of all gases evolved during the neutralization stage. The wet gases taken overhead are passed via a small drying unit to the gas holder for recycle back to the reactor. The degassed liquid is then completely neutralized and the n-paraffins are removed. The wet paraffins are routed via a small drying unit to the recycle paraffin surge tank. Operation of the stripper is carried out to give a product sulfonate of the required solids content. The product is pumped to produce storage.

In a batchwise modification of the process, the product is run into a suitable amount of 30% sodium hydroxide solution so that alkaline conditions are always maintained. This prevents oxidation of the free sulfur dioxide to sulfuric acid since the sulfur dioxide is converted to sulfite and the peroxy compounds are decomposed. The sulfite is subsequently decomposed to free sulfur dioxide by making the product just acid with dry product.

The following examples are given to illustrate the present invention.

Example I

Several runs were made in the manner described above. Table I below gives the manufacturing specifications for the charge feed.

TABLE I

| | |
|---|---|
| n-Paraffins | 97.5% w./w. |
| $C_8$ and less | 0.1% w./w. |
| $C_{13}$ and less | 5.0% w./w. max. |
| $C_{13}$ and less+$C_{14}$ | 45.0–70% w./w. |
| Heavier than $C_{14}$ | Balance to 100%. |
| O.D. at 270 m$\mu$ | 0.5. |
| Sulfur | 3 p.p.m. |

Table II gives an analysis of the n-paraffins used in different runs.

TABLE II

| Run numbers | 13A–15 | 18–35 | 38–43 | 47–50 |
|---|---|---|---|---|
| Density, 30/4 | 0.7580 | 0.7580 | 0.7580 | 0.7580 |
| Density, 60/60 | 0.7696 | 0.7696 | 0.7696 | 0.7696 |
| Oleum treated? | Yes | Yes | Yes | No |
| Optical density (at 270 m$\mu$) | 0.05 | 0.07 | 0.10 | 0.35 |
| n-Paraffins distribution by gas-liquid phase chrom. percent w/w: | | | | |
| n$C_{10}$ | | (¹) | | |
| n$C_{11}$ | | 0.1 | | 0.1 |
| n$C_{12}$ | (¹) | 0.1 | (¹) | 0.1 |
| n$C_{13}$ | 2.1 | 3.5 | 0.7 | 2.4 |
| n$C_{14}$ | 65.1 | 60.0 | 67.7 | 64.9 |
| n$C_{15}$ | 28.3 | 28.1 | 23.3 | 25.4 |
| n$C_{16}$ | 4.5 | 6.8 | 6.4 | 5.8 |
| n$C_{17}$ | (¹) | 1.2 | 1.5 | 1.0 |
| n$C_{18}$ | | 0.2 | 0.3 | 0.2 |
| n$C_{19}$ | | (¹) | (¹) | (¹) |
| Percent w/w n-paraffins | 99.0 | 99.0 | 99.0 | 99.0 |
| Calculated mol. wt | 203 | 203 | 203 | 203 |

¹ Trace.

Table III summarizes the conditions and results of experimental runs. The temperature was 35° C., 3% w./w. acetic anhydride was used and the recycle rate was 3.5 l./hr.

TABLE III

| Run No. | Pressure, p.s.i.g. | $SO_2/O_2$ inlet, V./V. | Percent $SO_2$ in exit gas, V./V. | Heavy phase, g./hr. | Mole sulfonic acids/hr. | Mono-di-/tri-sul-fonates, molar | Sulfo-nates, sulfate, molar | $SO_2$ dissolved in heavy phase, percent w./w. | Paraffin dissolved in heavy phase, percent w./w. | Mass recoveries, percent molar | | |
|---|---|---|---|---|---|---|---|---|---|---|---|---|
| | | | | | | | | | | n-Paraffin | $SO_2$ | $O_2$ |
| 18 | 75 | 1.92 | 59 | 780 | 21.6 | 47:49:4 | 1.40 | 11.0 | 9.5 | 98.5 | 94.5 | 72.0 |
| 19 | 50 | 1.86 | 64 | 620 | 16.1 | 52:46:2 | 1.74 | | 12.0 | 98.7 | 90.5 | 66.0 |
| 20 | 25 | 2.25 | 85 | 580 | 15.6 | 51:45:4 | 1.72 | 7.3 | 14.3 | 96.3 | 98.0 | 78.0 |
| 21 | Atmos. | 2.00 | 88 | 280 | 8.4 | 61:39:0 | 1.70 | 3.2 | 15.0 | 107.5 | 98.4 | 74.1 |
| 26 | 75 | 2.62 | 70 | 1,100 | 30.6 | 43:47:10 | 1.14 | 15.6 | 11.5 | 117.0 | 85.0 | 77.0 |
| 38 | 75 | 1.63 | 40 | 190 | 4.9 | 55:44:1 | 1.61 | | 10.5 | 97.0 | 81.0 | 54.0 |
| 30 | 25 | 2.15 | 70 | 400 | 11.0 | 56:41:3 | 1.90 | 5.1 | 13.8 | 99.0 | 90.0 | 81.9 |
| 31 | 25 | 1.77 | 53 | 230 | 6.0 | 62:38:0 | 1.67 | 5.0 | 18.0 | 98.5 | 97.0 | 88.0 |
| 32 | 25 | 1.10 | 40 | 100 | 2.7 | 65:35:0 | 2.00 | 2.5 | 16.0 | 96.0 | 96.0 | 85.0 |
| 39 | Atmos. | 1.90 | 75 | 210 | 5.2 | 62:38:0 | 1.86 | 1.9 | 15.0 | 91.0 | 86.0 | 76.0 |
| 41 | Atmos. | 1.30 | 59 | 100 | 2.5 | 66:34:0 | 1.90 | 1.3 | 18.0 | 94.0 | 2.0 | 75.0 |

Example II

A number of sulfoxidation runs (Nos. 145, 170, 192, 197, 207 and 223) was carried out to produce crude product for the investigation. The sulfoxidation reaction conditions used were as follows: 1 litre $nC_{11}$ paraffin, 2 wt. percent acetic anhydride, temperature 35° C., and gassing rates for $SO_2$ of 20 l./hr. and $O_2$ of 10 l./hr. All samples of heavy phase were taken when the rate of product formation was constant.

These runs show in detail the merits of the product neutralization procedures studied.

The neutralization procedures fall under four general headings: (i) alkaline, (ii) acid, (iii) aqueous and (iv) degassing. In all cases a sample of produce heavy phase was taken over 30 minutes (this is ca. 50–60 g.). In (i) the sample was run directly into 30% NaOH until finally just neutral to phenolphthalein both with and without cooling (in the latter case considerable heating occurs). In (ii) the sample and 30% NaOH were run in together in such proportions as to maintain slightly acid conditions until finally just neutral to phenolphthalein (again, both with and without cooling). In (iii) the sample was run into 25 ml. of distilled water then neutralized after the appropriate period variously (a) immediately, (b) after several hours (3 to 12 hrs.), (c) after 24 hrs. and (d) after from 24 hrs. to 1 week. The degassing procedure (iv) was performed either by evacuation of the sample or by means of a purge of dry nitrogen. In both cases the sample was neutralized immediately after the degassing (which generally took 3–5 hours). All samples were finally made neutral to phenolphthalein with NaOH, steam stripped to remove entrained paraffin and then azeotroped dry with butanol. The butanol insoluble material (mainly sodium sulfate) was filtered off and Soxhlet extracted with dry butanol. Butanol was finally removed from the extract under vacuum giving mono- and di-sodium sulfonates of undecane. Thus the weights of sodium sulfate and sodium alkyl-sulfonates were obtained and converted into moles, in the latter case, assuming the material to contain 10 mole percent disulfonates (i.e. Mol. Wt.=268.65). The reproducibility of the procedure was examined by taking 6 samples of a homogeneous blend of products (from typical $nC_{11}$ runs) and working them up in a manner identical to that described above.

TABLE V

| Procedure | 145 | | 170 | | 192 | | 197(A) | | 197(B) | | 207 | | 223(A) | | 223(B) | |
|---|---|---|---|---|---|---|---|---|---|---|---|---|---|---|---|---|
| | Ratio[1] | Percent[2] | Ratio[1] | Percent[2] | Ratio[1] | Percent[2] | Ratio[1] | Percent[2] | Ratio[1] | Percent[2] | Ratio[1] | Percent[2] | Ratio[1] | Percent[2] | Ratio[1] | Percent[2] |
| (i) Alkaline: | | | | | | | | | | | | | | | | |
| (a) Hot | 3.09 | 75.5 | 2.95 | 74.7 | | | | | | | | | 3.0 | 75.0 | 2.75 | 73.3 |
| (b) Cold | | | | | 2.09 | 68 | 2.49 | 71 | 2.49 | 71 | 2.32 | 70 | | | | |
| (ii) Acid: | | | | | | | | | | | | | | | | |
| (a) Hot | 2.58 | 72.1 | 2.25 | 69.2 | | | | | | | | | 2.19 | 68.6 | 2.80 | 73.7 |
| (b) Cold | | | | | 2.8 | 74 | 2.42 | 71 | 2.6 | 72 | | | | | | |
| (III) Water neutralized after hrs.: | | | | | | | | | | | | | | | | |
| (a) 0 | | | | | | | 3.2 | 76 | 3.0 | 75 | | | 2.30 | 69.7 | 2.38 | 70.4 |
| (b) 3,5 or 12 | | | | | | | 2.65 | 73 | 2.87 | 74 | 2.45 | 71 | 2.13 | 68.0 | | |
| (c) 24 | | | 2.07 | 67.4 | | | | | | | | | 2.18 | 68.5 | 2.36 | 70.2 |
| (d) 24 | | | | | | | | | | | | | 2.30 | 69.7 | 2.18 | 68.5 |
| (iv) Degas: | | | | | | | | | | | | | | | | |
| (a) $N_2$ purge | | | | | | | | | | | 2.92 | 74 | | | | |
| (b) Vacuum | 2.58 | 72.1 | 2.41 | 70.7 | 3.03 | 75 | 3.22 | 76 | 3.21 | 75 | | | 2.65 | 72.6 | 2.62 | 72.4 |

[1] $\dfrac{RSO_3H}{H_2SO_4}$ molar.

[2] Mole percent sulphonates.

The results given in Table V above show that the two degassing procedures given consistently better results than average as does the procedure in which product is run into excess NaOH without cooling.

The next best neutralization method is the one where product is run into water with immediate neutralization—other methods give mainly inferior results. These three best procedures are consistent with the idea that free sulfur dioxide in the product must be removed quickly. By so doing, the oxidation of sulfurous to sulfuric by peroxy compounds is prevented. That this oxidation occurs is shown by the result for 2 samples in which a known weight of product heavy phase was taken, in one case being degassed under vacuum before neutralization, in the other being immediately neutralized with NaOH in the cold. These gave sulfonates/sulfate mole ratios of 3.2 and 2.09 sulfonate/sample weight ratios 0.77 and 0.77, and sulfate/sample weight ratios 0.125 and 0.193 respectively. This clearly shows that the fall in sulfonate/sulfate mole ratio is directly due to a rise in sulfate content by the process described above.

In terms of mole percent sulfonate(s) the differences are not so striking—all the results fall in the range 67.4–76.0 mole percent sulfonates with the majority at 72±2 mole percent sulfonates.

The above data show that variation in the neutralization procedure does give rise to variation in product composition. Procedures which minimize the $SO_2$ content of the heavy phase (e.g. in particular the degassing procedures) give products generally lower in sulfate content than average. The direct, non-moderated, neutralization with sodium hydroxide also gives a lower content of sulfate in the product and thus constitutes a preferred embodiment of the present invention.

While there have been described above certain specific embodiments of the present invention, it will be manifest

What is claimed is:

1. Process for producing sulfonic acids comprising in combination reacting in a reaction zone substantially straight chain saturated liquid hydrocarbons having from about 7 to about 24 carbon atoms per molecule and containing no more than about 0.01 weight percent of aromatics or of olefins with oxygen and sulfur dixodie under substantially anhydrous conditions in the presence of one to four percent by weight of a low molecular weight acyl oxide at temperatures of about 25 to 55° C. under pressures of from about 0 to 1000 p.s.i.g. while agitating throughout the process the reactants; withdrawing unreacted oxygen and sulfur dioxide and continuously removing the resulting heavy phase containing product and entrained unreacted hydrocarbons from the said zone.

2. Process according to claim 1 wherein the reaction temperature ranges from 25 to 35° C.

3. Process according to claim 1 wherein the inlet ratio (vol.) of sulfur dioxide to $O_2$ ranges from 2 at 0 p.s.i.g. to 3 at 75 p.s.i.g.

4. Process according to claim 1, wherein the pressure ranges from 0 to 25 p.s.i.g.

5. Process according to claim 1 wherein said heavy product phase is run into water and subsequently neutralized with an alkali metal hydroxide to form alkali metal sulfonates.

6. Process according to claim 1 wherein said heavy product phase is made basic to decompose alkylacetyl sulfonyl peroxides therein then made slightly acid to break down bisuslphite and neutralized.

7. Process according to claim 6, wherein said neutralization is effected by running said product phase into excess aqueous base until said base becomes neutral.

8. Process according to claim 6 wherein said neutralization is effected by degassing, followed by the addition of base.

9. Process according to claim 6 wherein said neutralization is effected by mixing said product phase with enough base to maintain slightly acid conditions until the mixture is just neutral to phenolphthalein.

10. Process according to claim 1, wherein said hydrocarbons have from about 11 to about 18 carbon atoms per molecule.

11. Process according to claim 1, wherein said hydrocarbons are normally solid over said temperatures of 25 to 55° C. and are reacted in solution in an inert solvent.

References Cited

UNITED STATES PATENTS

| | | | |
|---|---|---|---|
| 3,260,741 | 7/1966 | Mackinnon et al. | 260—504 |
| 2,325,320 | 7/1943 | Holuba | 260—504 |

FOREIGN PATENTS

| | | | |
|---|---|---|---|
| 1,806,883 | 6/1969 | Germany | 260—504 |

OTHER REFERENCES

"Unit Processes In Organic Sythesis," Groggins, McGraw-Hill, 5th ed., 1958, p. 331.

LEON ZITVER, Primary Examiner

A. SIEGEL, Assistant Examiner

U.S. Cl. X.R.

260—513 R; 252—554